(12) United States Patent
Prince (10) Patent No.: US 10,272,370 B2
(45) Date of Patent: Apr. 30, 2019

(54) ANTI-DRIP FILTER ASSEMBLY

(71) Applicant: Haier US Appliance Solutions, Inc., Wilmington, DE (US)

(72) Inventor: Ryan John Prince, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 39 days.

(21) Appl. No.: 15/493,197

(22) Filed: Apr. 21, 2017

(65) Prior Publication Data

US 2018/0304181 A1   Oct. 25, 2018

(51) Int. Cl.
| | |
|---|---|
| *B01D 35/30* | (2006.01) |
| *C02F 1/00* | (2006.01) |
| *B01D 35/153* | (2006.01) |
| *F25D 23/12* | (2006.01) |
| *B01D 29/33* | (2006.01) |
| *C02F 1/28* | (2006.01) |
| *C02F 1/44* | (2006.01) |

(52) U.S. Cl.
CPC .......... *B01D 35/153* (2013.01); *B01D 29/33* (2013.01); *C02F 1/003* (2013.01); *F25D 23/126* (2013.01); *B01D 2201/302* (2013.01); *B01D 2201/303* (2013.01); *C02F 1/283* (2013.01); *C02F 1/444* (2013.01); *C02F 2201/005* (2013.01); *C02F 2201/006* (2013.01); *C02F 2307/10* (2013.01); *C02F 2307/12* (2013.01); *F25D 2323/121* (2013.01)

(58) Field of Classification Search
CPC ................ B01D 35/153; B01D 35/30; B01D 2201/302; F25D 23/126; F25D 2323/121; C02F 1/283; C02F 1/003; C02F 2201/005; C02F 2307/10; C02F 2201/006
USPC .............................. 210/440, 443, 444, 493.2
See application file for complete search history.

(56) References Cited

U.S. PATENT DOCUMENTS

| | | | | |
|---|---|---|---|---|
| 5,094,745 | A * | 3/1992 | Reynolds | B01D 37/025 210/266 |
| 5,462,675 | A * | 10/1995 | Hopkins | B01D 29/114 210/767 |
| 6,632,355 | B2 | 10/2003 | Fritze | |
| 7,506,666 | B2 | 3/2009 | Tubby et al. | |
| 8,177,973 | B2 | 5/2012 | Kennedy et al. | |
| 8,182,699 | B2 | 5/2012 | Fritze | |

(Continued)

FOREIGN PATENT DOCUMENTS

CN        204073857 U     1/2015

*Primary Examiner* — Madeline Gonzalez
(74) *Attorney, Agent, or Firm* — Dority & Manning, P.A.

(57) ABSTRACT

An anti-drip filter assembly is provided herein. The filter assembly may define a filtration path between a fluid inlet and a fluid outlet. The filter assembly may include a filter medium and an end cap. The filter medium may define a filtered volume and unfiltered volume. The filter medium may extend along an axial direction between a first end and a second end. The first end may be proximal the fluid inlet and fluid outlet, and the second end may be distal the fluid inlet and the fluid outlet. The end cap may be disposed on the first end of the filter medium. Moreover, the filter assembly may define a capillary passage directing a fluid flow along the filtration path. The capillary passage may have a passage width equal to or less than a capillary width of water therein.

6 Claims, 10 Drawing Sheets

(56) References Cited

U.S. PATENT DOCUMENTS

| | | |
|---|---|---|
| 9,011,686 B2 | 4/2015 | Kirchner et al. |
| 2006/0091047 A1* | 5/2006 | Ye ..................... B01D 21/0012 210/109 |

* cited by examiner

ANTI-DRIP FILTER ASSEMBLY

FIELD OF THE INVENTION

The present subject matter relates generally to filter assemblies, such as filter assemblies for refrigerator appliances.

BACKGROUND OF THE INVENTION

Water filters are generally divided into two classes: point of entry water filters and point of use water filters. Point of use water filters can be installed at, for example, a kitchen sink or within a refrigerator appliance to filter water entering such devices. In order to filter water, water filters are generally provided with a filtering media, such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The filter media may have multiple pores that permit a flow of water through the media (e.g., carbon block). By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the filter. However, the filtering capacity of the filtering media can decrease over time. For example, capacity may increase due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

In order to hinder such bacteria growth and insure that the filtering media has not exceeded its filtering capacity, the water filter is preferably replaced or serviced about every six months regardless of its current performance. However, changing the water filter can be a messy and time consuming task. For example, when a filter cartridge is removed from a manifold, water can spill from the manifold. In order to limit spilling, water flow to the manifold can be terminated with a valve. However, actuating a valve can be time consuming and inconvenient. Thus, certain consumers only replace the water filter after it has become blocked, e.g., by sediment accumulation around and within the carbon block. Moreover, filters that are mounted in certain orientations, e.g., horizontally, may naturally spill water when they are removed.

Accordingly, a water filter with features for hindering spilling of water during removal or replacement of a filter cartridge would be useful.

BRIEF DESCRIPTION OF THE INVENTION

Aspects and advantages of the invention will be set forth in part in the following description, or may be obvious from the description, or may be learned through practice of the invention.

In one aspect of the present disclosure, a filter assembly is provided. The filter assembly may define a filtration path between a fluid inlet and a fluid outlet. The filter assembly may include a filter medium and an end cap. The filter medium may define a filtered volume and unfiltered volume. The filter medium may extend along an axial direction between a first end and a second end. The first end may be proximal the fluid inlet and fluid outlet, and the second end may be distal the fluid inlet and the fluid outlet. The end cap may be disposed on the first end of the filter medium. Moreover, the filter assembly may define a capillary passage directing a fluid flow along the filtration path. The capillary passage may have a passage width equal to or less than a capillary width of water therein.

In another aspect of the present disclosure, a filter assembly is provided. The filter assembly may define an axial direction and a radial direction. The filter assembly may include a manifold and a filter cartridge. The manifold may have a spool valve, the spool valve comprising a housing, a spool body, a male inlet port, and a male outlet port. The spool body may be received in the housing such that the spool body is rotatable relative to the housing. The male inlet port and the male outlet port may be mounted to the spool body such that the male inlet port and the male outlet port extend away from the spool body along the axial direction. The male inlet port and the male outlet port may be spaced apart from each other along the radial direction. The filter cartridge may be mountable to the manifold. The filter cartridge may include a casing, a filter medium, and an end cap. The filter medium may be positioned within the casing. The filter medium may define a filtered volume and unfiltered volume. The filter medium may extend along an axial direction between a first end proximal the manifold, and a second end distal the manifold. The end cap may be disposed on the first end of the filter medium. The filter assembly may define a capillary passage may direct a fluid flow along a filtration path. The capillary passage may have a passage width equal to or less than a capillary width of water therein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, a filter for use in a refrigerator appliance is provided. The filter may include a filter medium that is positioned within a filter cartridge. An end cap may be placed on the filter medium, and a tension ridge may be placed or formed on the end cap. The tension ridge may generally define a capillary passage that is large enough to permit the flow of water under pressure, yet small enough for water to maintain surface tension within the capillary passage when water is not being directed through the filter.

Figure 1:
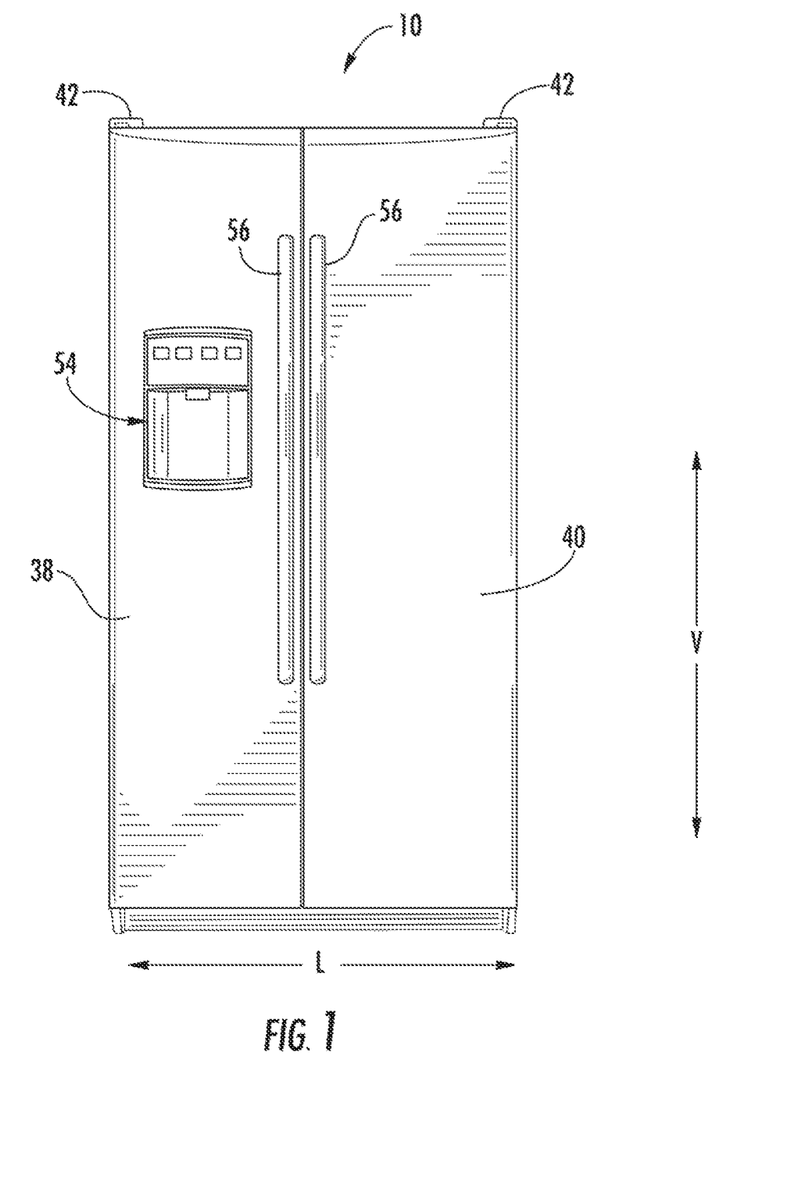
FIG. 1 provides a perspective view of a refrigerator appliance according to example embodiments of the present disclosure.

FIG. 1 is a perspective view of a refrigeration appliance 10 according to example embodiments of the present disclosure. Generally, refrigerator appliance 10 defines a vertical direction V, a lateral direction L, and a transverse direction (not drawn in FIG. 1). The vertical direction V, lateral direction L, and transverse direction are mutually perpendicular and form an orthogonal direction system, as generally illustrated.

Refrigerator appliance 10 may include a filter assembly 60 that includes features for facilitating maintenance and/or servicing of filter assembly 60. It should be appreciated that refrigerator appliance 10 is provided for illustrative purposes only and that the present subject matter is not limited to any particular type, style, or configuration of refrigeration appliance, and may be used in or with another suitable appliance, such as any manner of refrigerator, freezer, refrigerator/freezer combination, and so forth.

Figure 2:
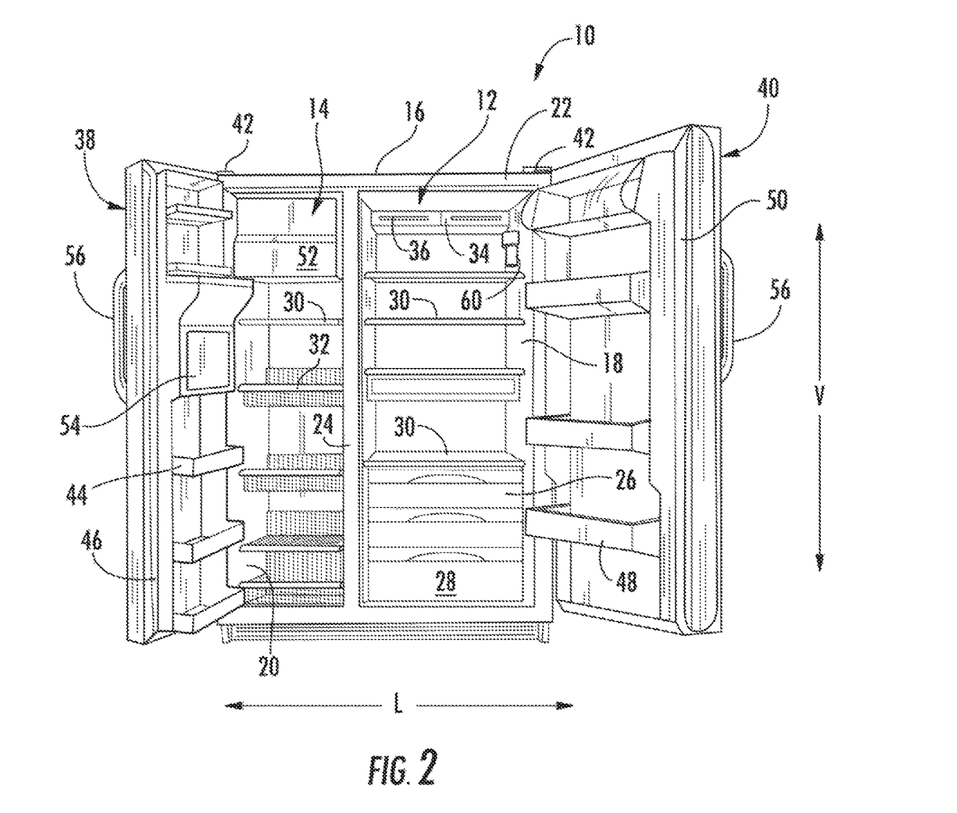
FIG. 2 provides a perspective view of the example refrigerator appliance of FIG. 1, wherein the doors shown open.

Referring to FIG. 2, refrigerator appliance 10 defines a separate a fresh food storage compartment 12 and a freezer storage compartment 14. In some such embodiments, compartments 12 and 14 are arranged side-by-side and contained within an outer case 16 and inner liners 18 and 20 that are generally molded from a suitable plastic material. Thus, refrigerator appliance 10 is generally referred to as a side-by-side style refrigerator appliance. In alternative exemplary embodiments, refrigerator appliance 10 may include a single liner and a mullion that spans between opposite sides of the single liner to divide it into freezer storage compartment 14 and fresh food storage compartment 12. Outer case 16 is normally formed by folding a sheet of a suitable material, such as pre-painted steel, into an inverted U-shape to form top and side walls of outer case 16. A bottom wall of outer case 16 normally is formed separately and attached to the case side walls and to a bottom frame that provides support for refrigerator appliance 10.

A breaker strip 22 extends between a case front flange and outer front edges of inner liners 18 and 20. Breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which is commonly referred to as a mullion (e.g., mullion 24), and may be formed of an extruded ABS material. Breaker strip 22 and mullion 24 form a front face, and extend completely around inner peripheral edges of outer case 16 and vertically between inner liners 18 and 20.

Slide-out drawers 26, a storage bin 28, and shelves 30 are normally provided in fresh food storage compartment 12 to support items being stored therein. In addition, at least one shelf 30 and at least one wire basket 32 may be provided in freezer storage compartment 14.

Features of refrigerator appliance 10 are generally controlled or regulated with a controller 34. For example, features may be controlled according to user preference via manipulation of a control interface 36. As shown, control interface may be mounted in an upper region of fresh food storage compartment 12 and coupled to controller 34. As used herein, the term "controller" is not limited to just those integrated circuits referred to in the art as microprocessor, but broadly refers to computers, processors, microcontrollers, microcomputers, programmable logic controllers, application specific integrated circuits, and other programmable circuits, and these terms are used interchangeably herein.

A freezer door 38 and a fresh food door 40 close access openings to freezer storage compartment 14 and fresh food storage compartment 12. Freezer door and fresh food door 38 and 40 are each mounted by a top hinge 42 and a bottom hinge (not shown) to rotate about their respective outer vertical edges between an open position, as shown in FIG. 1, and a closed position. Freezer door 38 may include a plurality of storage shelves 44 and a sealing gasket 46. Fresh food door 40 may also include a plurality of storage shelves 48 and a sealing gasket 50.

Freezer storage compartment 14 may include an automatic ice maker 52 and a dispenser 54 provided in freezer door 38 such that ice and/or chilled water can be dispensed without opening freezer door 38, as is well known in the art. Freezer door and fresh food door 38 and 40 may be opened by handles 56.

As with known refrigerators, refrigerator appliance 10 may also include a machinery compartment (not shown) that at least partially contains components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

In some embodiments, refrigerator appliance 10 includes a filter assembly 60 for filtering water coming into refrigerator appliance 10 from a water supply (not shown), such as a municipal water source or a well. During use, filter assembly 60 can remove contaminants such as chlorine, chloroform, lead, arsenic, pharmaceuticals, microbes, and/or other undesirable substances from water supplied to refrigerator appliance 10. In particular, filter assembly 60 can supply filtered water to ice maker 52 and/or dispenser 54. As will be understood and used herein, the term "water" includes purified water and solutions or mixtures containing water and, e.g., elements (such as calcium, chlorine, and fluorine), salts, bacteria, nitrates, organics, and other chemical compounds or substances.

Figure 3:
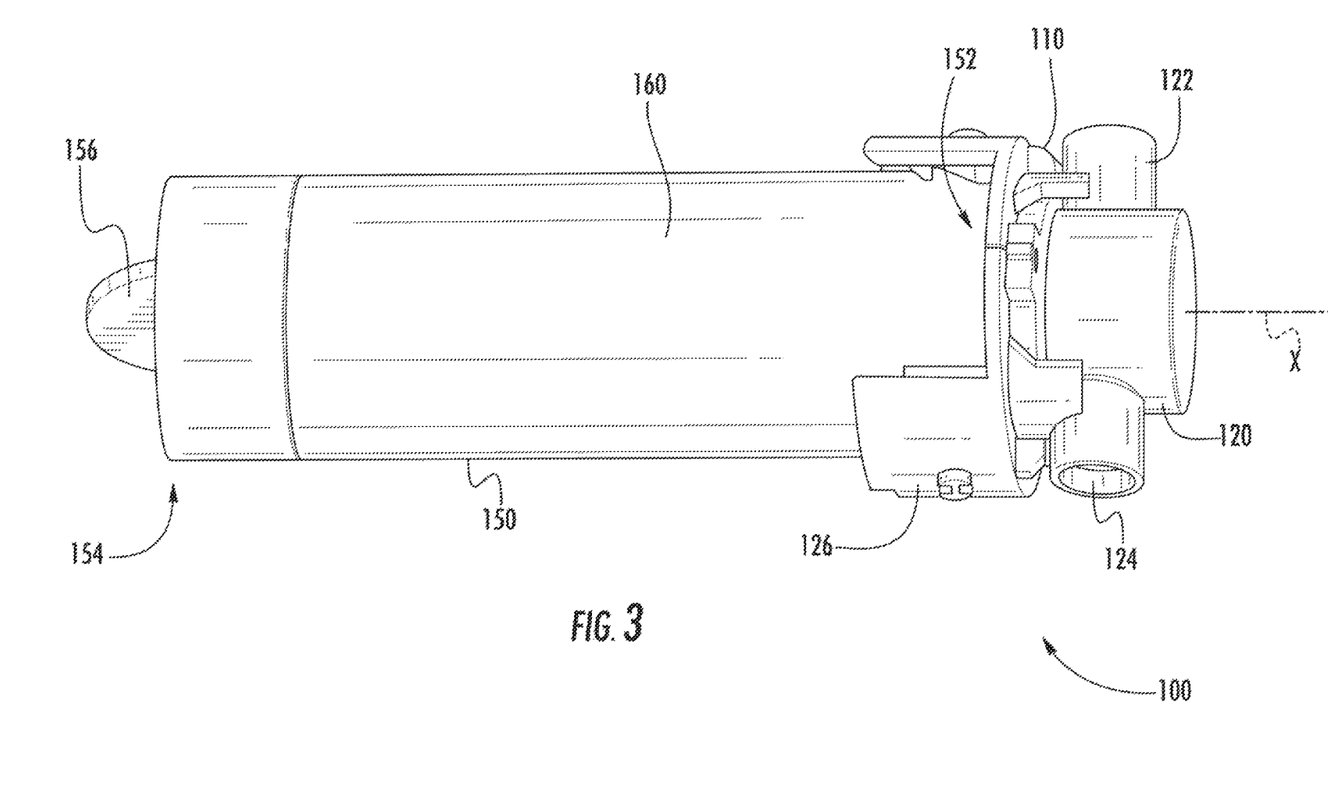
FIG. 3 provides a perspective view of a filter assembly according to example embodiments of the present disclosure.

FIG. 3 provides a perspective view of a filter assembly 100 according to example embodiments of the present disclosure. Filter assembly 100 may be utilized as a point of entry filter or a point of use filter. As an example, filter assembly 100 may be utilized in refrigerator appliance 10 as filter assembly 60. Thus, filter assembly 100 is described in greater detail below in the context of a horizontal mounting within refrigerator appliance 10. In alternative example embodiments, filter assembly 100 may be used in any other suitable appliance, such as in an ice maker, as a point of use water filtration system (e.g., installed beneath a sink), or as a point of entry water filtration system for an entire household. Moreover, as also discussed in greater detail below, filter assembly 100 includes features for assisting with changing a filter cartridge 150, e.g., without water leaking from a manifold 110.

As may be seen in FIG. 3, filter assembly 100 includes manifold 110 and filter cartridge 150. Filter cartridge 150 may be generally mounted to manifold 110 in order to filter water passing through manifold 110. For instance, filter cartridge 150 may be mounted horizontally. In other words, filter cartridge 150 may extend perpendicular to the vertical direction V (FIG. 1). However, in alternative embodiments, other mounting orientations relative to the vertical direction V may be provided (e.g., a mounting orientation that provides filter cartridge 150 at a non-perpendicular angle relative to the vertical direction V). Irrespective of the mounting orientation, as a filtering capacity of filter cartridge 150 decreases or at regular intervals, filter cartridge 150 may be changed in order to ensure continuous, effective filtering of water flowing through manifold 110.

Figure 4:
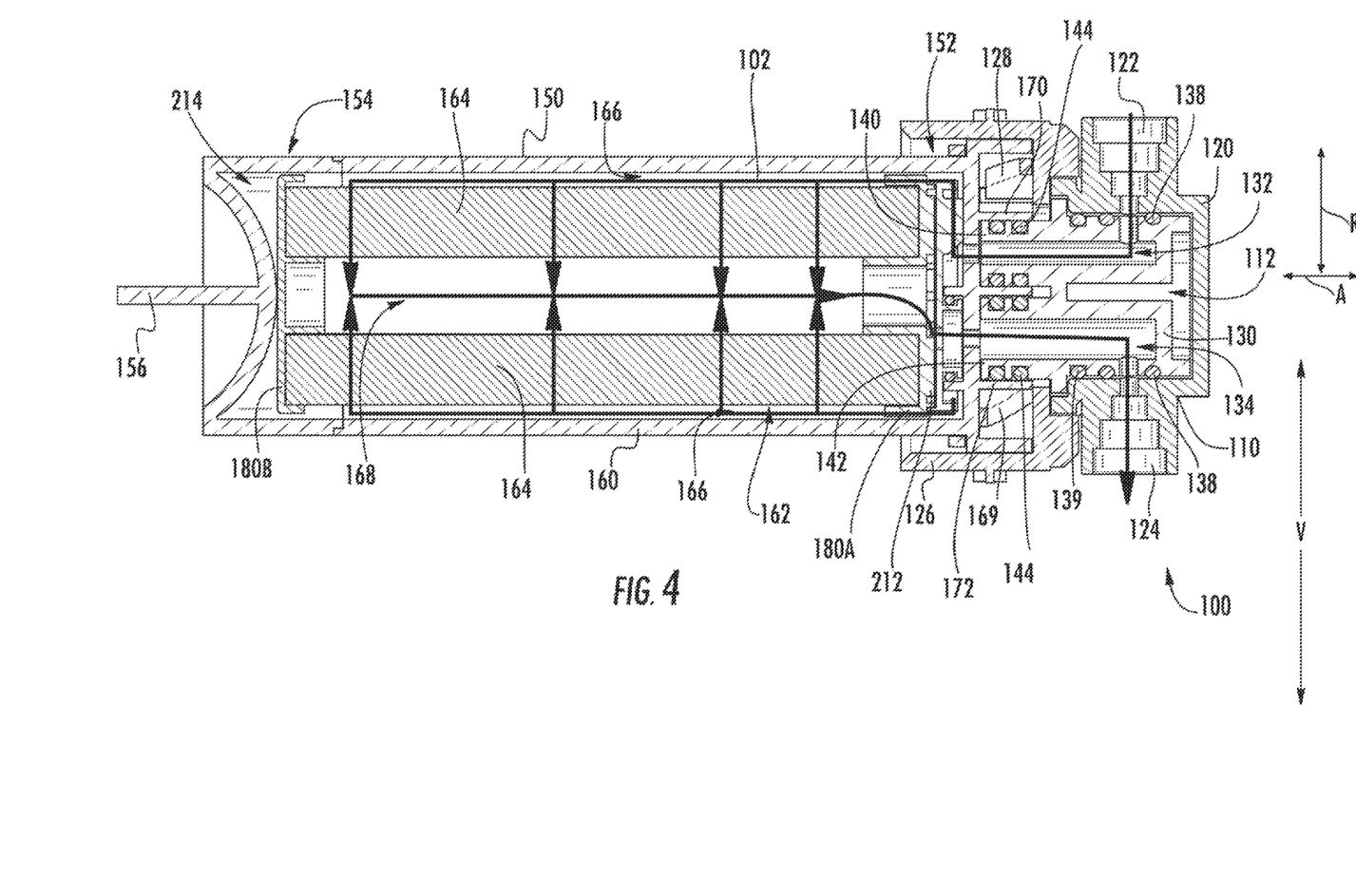
FIG. 4 provides a cross-sectional view of the example filter assembly of FIG. 3, wherein a spool valve shown in an open configuration.
Figure 5:
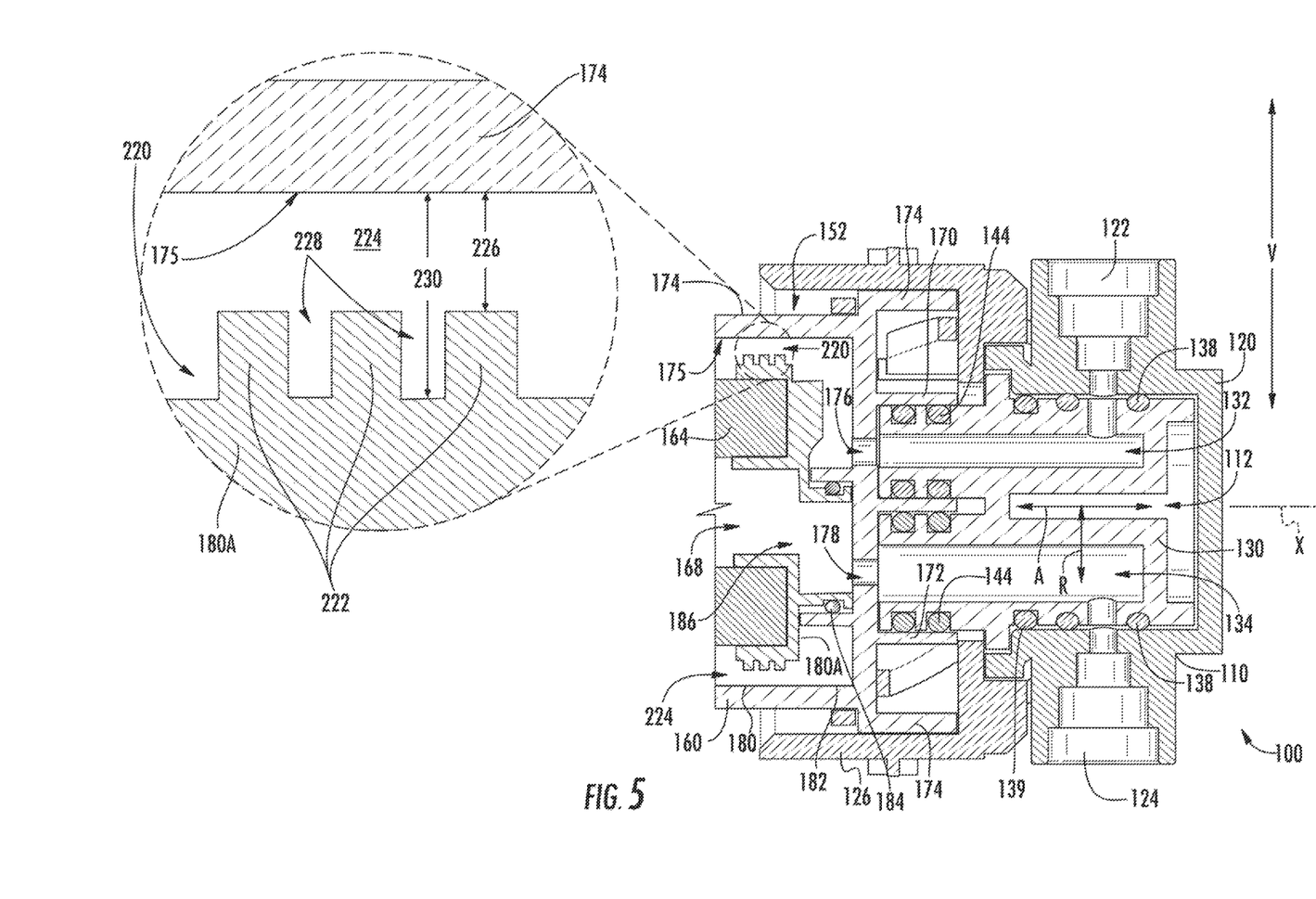
FIG. 5 provides a partial, cross-sectional view of the example filter assembly and spool valve of FIG. 4.
Figure 6:
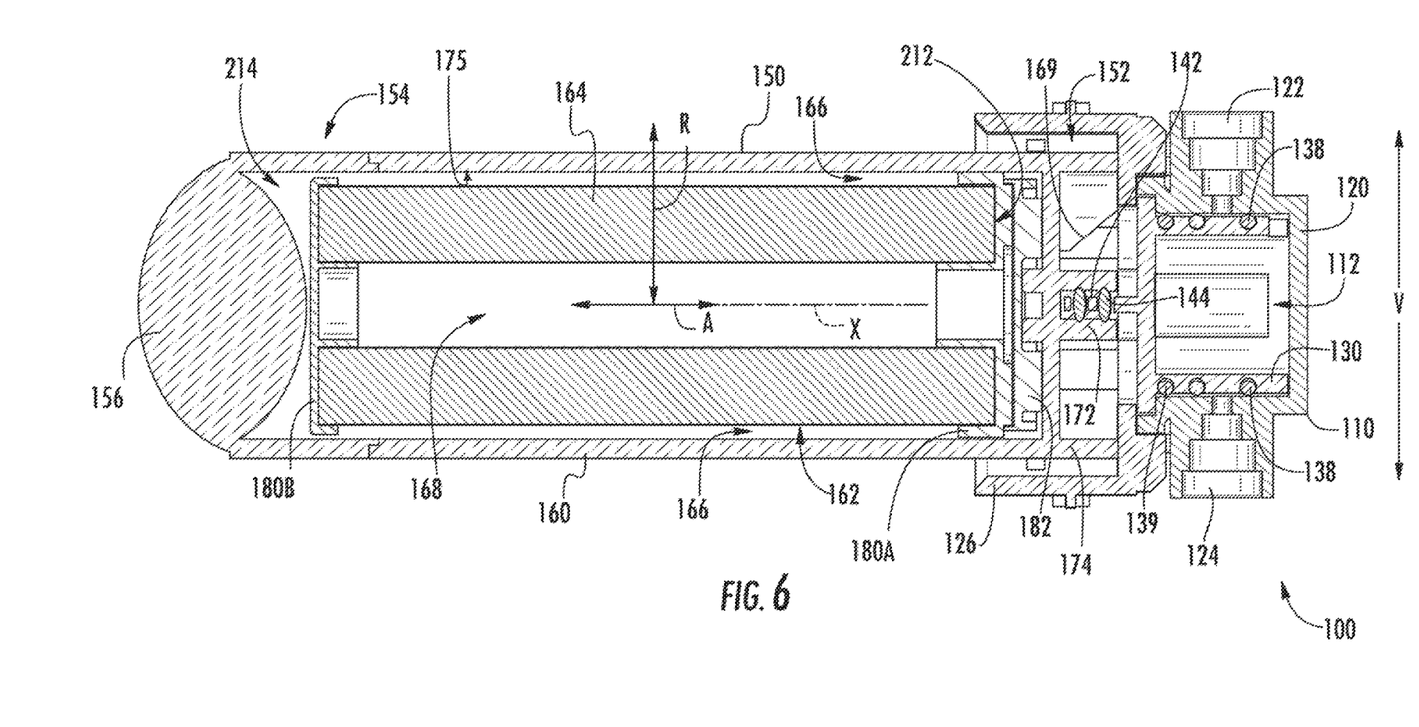
FIG. 6 provides a cross-sectional view of the example filter assembly of FIG. 3, wherein a spool valve shown in a closed configuration.
Figure 7:
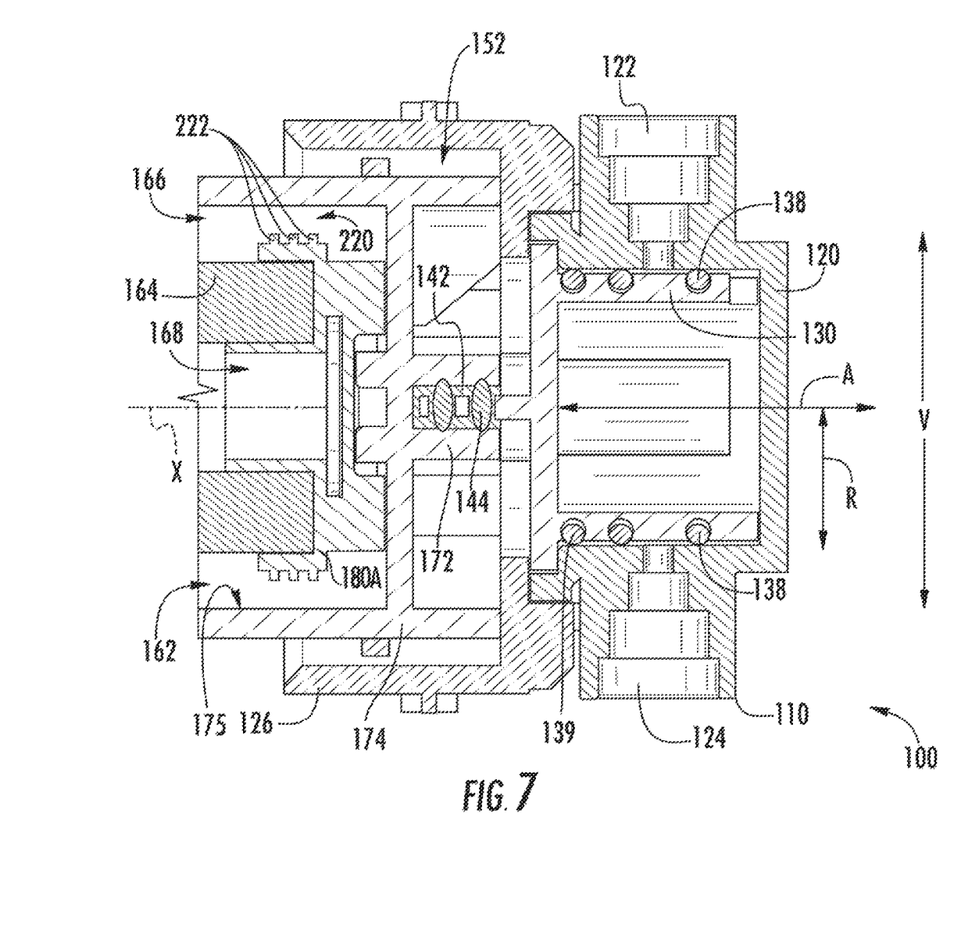
FIG. 7 provides a partial, cross-sectional view of the example filter assembly and spool valve of FIG. 6.

FIG. 4 provides a cross-sectional view of filter assembly 100, and FIG. 5 provides a magnified, cross-sectional view of a portion of filter assembly 100. In FIGS. 4 and 5, a spool valve 112 of filter assembly 100 is shown in an open configuration. In the open configuration, unfiltered water from manifold 110 may generally flow to filter cartridge 150, and filtered water may generally flow from filter cartridge 150 to manifold 110. FIG. 6 also provides a cross-sectional view of filter assembly 100, and FIG. 7 provides another magnified, cross-sectional view of a portion of filter assembly 100. In FIGS. 6 and 7, spool valve 112 of filter assembly 100 is shown in a closed configuration. In the closed configuration, spool valve 112 generally blocks or restricts unfiltered water from manifold 110 from flowing to filter cartridge 150, and spool valve 112 also blocks or restricts filtered water from flowing from filter cartridge 150 to manifold 110. Various features of filter assembly 100 are discussed in greater detail below in the context of FIGS. 4 through 7.

As may be seen in FIGS. 4 through 7, filter assembly 100 defines an axial direction A and a radial direction R that are perpendicular to each other. Moreover, manifold 110 includes spool valve 112 that regulates water flow from manifold 110 through filter cartridge 150. In some embodiments, spool valve 112 includes a housing 120, a spool body 130, a male inlet port 140 and a male outlet port 142. Housing 120 of spool valve 112 includes an inlet conduit 122 and an outlet conduit 124. When assembled, inlet conduit 122 may be coupled to a pressurized water supply, such as a municipal water supply or well, and unfiltered water may enter filter assembly 100 at inlet conduit 122 of housing 120. Outlet conduit 124 may receive filtered water from filter cartridge 150 and direct such filtered water out of filter assembly 100, e.g., to a faucet, water dispenser, ice maker, etc. Thus, components downstream of outlet conduit 124 (e.g., relative to the filtration path 102) that are fluidly coupled to filter assembly 100 may receive filtered water from filter assembly 100. A bracket 126 may assist with coupling housing 120 to a wall of refrigerator appliance 10 or any other suitable structure. As an example, bracket 126 may be fastened to the wall (e.g., in a generally horizontal orientation) with screws, nails, etc. that extend through bracket 126 into the wall. In optional embodiments, when mounted, the axial direction A is generally positioned perpendicular or otherwise at an angle to the vertical direction V (i.e., not parallel to the vertical direction V).

When assembled, spool body 130 may be received in housing 120. In particular, spool body 130 is received in housing 120 such that spool body 130 is rotatable relative to housing 120 on an axis of rotation X. As shown, the axis of rotation X of spool body 130 may be parallel to the axial direction A. By rotating spool body 130 within housing 120, spool valve 112 may be actuated between the open and closed configurations. As an example, spool body 130 may rotate by ninety degrees on the axis of rotation X in housing 120 between the open and closed configurations. Thus, spool body 130 is shown rotated by ninety degrees on the axis of rotation X in housing 120 from the open configuration (FIGS. 4 and 5) and the closed configuration (FIGS. 6 and 7) in the example embodiments of FIGS. 4 through 7.

Male inlet port 140 and male outlet port 142 are mounted to or on spool body 130. For example, male inlet port 140 and male outlet port 142 may be formed with spool body 130. Thus, spool body 130, male inlet port 140 and male outlet port 142 may be integrally formed (e.g., as a unitary monolithic element) of or with a single, continuous piece of material, such as molded plastic. In some embodiments, male inlet port 140 and male outlet port 142 are mounted to or on spool body 130 such that male inlet port 140 and male outlet port 142 extend from spool body 130 along the axial direction A from spool body 130. Male inlet port 140 and male outlet port 142 may also be spaced apart or offset from each other along the radial direction R on spool body 130.

As discussed above, filter cartridge 150 is selectively mountable to manifold 110. In some such embodiments, filter cartridge 150 includes a casing 160 that extends between a first end portion 152 and a second end portion 154, e.g., along the axial direction A. Casing 160 may be a cylindrical casing such that casing 160 has a generally circular cross-section in a plane that is perpendicular to the axial direction A. As shown, a filter medium 164 is disposed within casing 160, e.g., within a chamber 162 defined by casing 160. Filter medium 164 extends between a first medium end 212 and a second medium end 214, e.g., along the axial direction A. When assembled, first medium end 212 may be positioned proximal male inlet port 140 and male outlet port 142, and second medium end 214 may be positioned distal male inlet port 140 and male outlet port 142. In turn, first medium end 212 may be closer to ports 140 and 142 than second medium end 214.

Generally, filter medium 164 divides chamber 162 into an unfiltered volume 166 and a filtered volume 168. As an example, unfiltered volume 166 may extend around filtered volume 168, and water may flow through filter medium 164 along the radial direction R from unfiltered volume 166 to filtered volume 168. During use, filter medium 164 may remove impurities and contaminants from water passing through filter medium 164 from unfiltered volume 166 to filtered volume 168. Filter medium 164 may include any suitable mechanism or media for filtering water such as, e.g., ceramic filters, activated carbon filters, polymer filters, or reverse osmosis filters. In particular, filter medium 164 may be a hollow, cylindrical block of activated carbon.

As used herein, the term "unfiltered" describes fluid that is not filtered relative to filter medium 164, and the term "filtered" describes fluid that is filtered relative to filter medium 164. Thus, the term "unfiltered volume" describes a volume within chamber 162 that is not filtered relative to filter medium 164, and the term "filtered volume" describes a volume within chamber 162 that is filtered relative to filter medium 164. However, as will be understood, filter assembly 100 (or an associated appliance, such as refrigerator appliance 10) may include additional filters that filter water entering chamber 162. Thus, "unfiltered volume" may be filtered relative to other filters but not filter medium 164.

Filter cartridge 150 generally includes or defines a female inlet port 170 and a female outlet port 172. In some embodiments, female inlet port 170 and female outlet port 172 are mounted to casing 160. For instance, female inlet port 170 and female outlet port 172 may be mounted at first end portion 152 of casing 160. As an example, female inlet port 170 and female outlet port 172 may be integrally formed (e.g., as a unitary monolithic element) with casing 160 such that casing 160, female inlet port 170 and female outlet port 172 are constructed of or with a single, continuous piece of material, such as molded plastic. Female inlet port 170 is sized and positioned on filter cartridge 150 to receive male inlet port 140 of manifold 110 when filter cartridge 150 is mounted to manifold 110. Similarly, female outlet port 172 is sized and positioned on filter cartridge 150 to receive male outlet port 142 of manifold 110 when filter cartridge 150 is mounted to manifold 110. Thus, in order to correspond to male inlet port 140 and male outlet portion 142, female inlet port 170 and female outlet port 172 (e.g., central axes of female inlet port 170 and female outlet port 172) may be spaced apart from each other along the radial direction R on casing 160.

During use, water may flow through filter assembly 100 along a filtration path (e.g., as represented generally by the arrows 102). For instance, unfiltered water may flow from manifold 110 into filter cartridge 150 via the connection or coupling between male inlet port 140 of manifold 110 and female inlet port 170 of filter cartridge 150. As shown, filtration path 102 may thus extend through a fluid aperture or inlet 176 defined by filter cartridge 150, e.g., at the female inlet port 170. Filtered water may flow from filter cartridge 150 to manifold 110 via the connection or coupling between male outlet port 142 of manifold 110 and female outlet port 172 of filter cartridge 150. In turn, filtration path 102 may extend through a fluid aperture or outlet 178 defined by filter cartridge 150, e.g., at the female outlet port 172.

As may be seen in FIGS. 4 and 5, when spool valve 112 is in the open configuration, an inlet passage 132 of spool body 130 extends between inlet conduit 122 of housing 120 and male inlet port 140 of manifold 110 such that inlet conduit 122 of housing 120 and male inlet port 140 of manifold 110 are in fluid communication with each other via inlet passage 132 of spool body 130. Similarly, an outlet passage 134 of spool body 130 extends between outlet conduit 124 of housing 120 and male outlet port 142 of manifold 110 when spool valve 112 is in the open configuration such that outlet conduit 124 of housing 120 and male outlet port 142 of manifold 110 are in fluid communication with each other via outlet passage 134 of spool body 130. In contrast, as may be seen in FIGS. 6 and 7, when spool valve 112 is in the closed configuration, inlet passage 132 of spool body 130 does not extend between inlet conduit 122 of housing 120 and male inlet port 140 of manifold 110. Thus, inlet conduit 122 of housing 120 and male inlet port 140 of manifold 110 are not in fluid communication with each other via inlet passage 132 of spool body 130 when spool valve 112 is in the closed configuration. Similarly, outlet passage 134 of spool body 130 does not extend between outlet conduit 124 of housing 120 and male outlet port 142 of manifold 110 when spool valve 112 is in the closed configuration. Thus, outlet conduit 124 of housing 120 and male outlet port 142 of manifold 110 are not in fluid communication with each other via outlet passage 134 of spool body 130 when spool valve 112 is in the closed configuration.

In order to shift spool valve 112 between the open and closed configurations, spool body 130 may be rotatable within housing 120 with filter cartridge 150. For example, in some such embodiments a user may grasp filter cartridge 150 (e.g., at a fin or handle 156 positioned at second end portion 154 of casing 160) and rotate filter cartridge 150 such that spool body 130, which may be coupled to filter cartridge 150, also rotates with filter cartridge 150. In such a manner, a user may adjust spool valve 112 between the open configuration (shown in FIGS. 4 and 5) and the closed configuration (shown in FIGS. 6 and 7) with filter cartridge 150. Handle 156 may be positioned opposite female inlet port 170 and female outlet port 172 on casing 160 along the axial direction A. Thus, filter medium 164 may be positioned between handle 156 and female inlet and outlet ports 170 and 172 along the axial direction A within casing 160.

Generally, filter cartridge 150 may be removed or disconnected from manifold 110 when spool valve 112 is in the closed configuration. Thus, when spool valve 112 stops fluid flow from manifold 110 into filter cartridge 150, filter cartridge 150 may be conveniently removed from manifold 110, e.g., to facilitate cleaning or replacement of filter cartridge 150.

Figure 8:
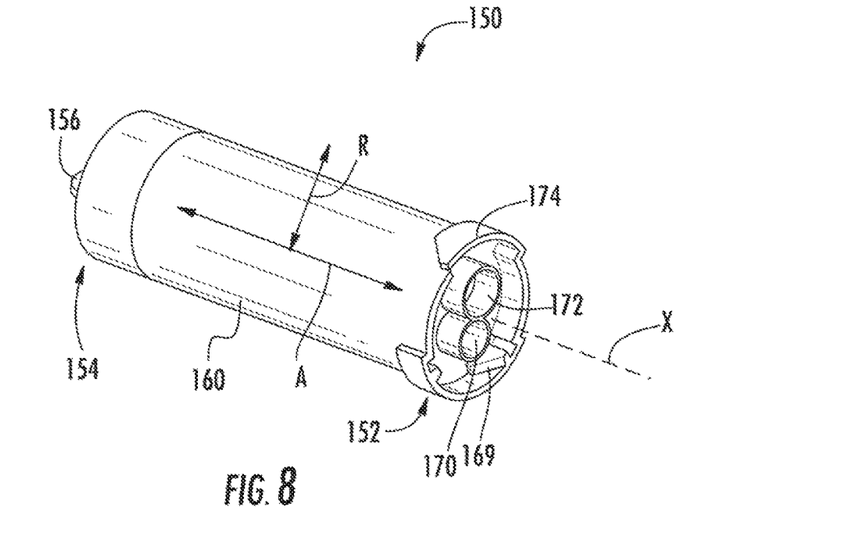
FIG. 8 provides a perspective view of the filter cartridge of the example filter assembly of FIG. 3.
Figure 9:
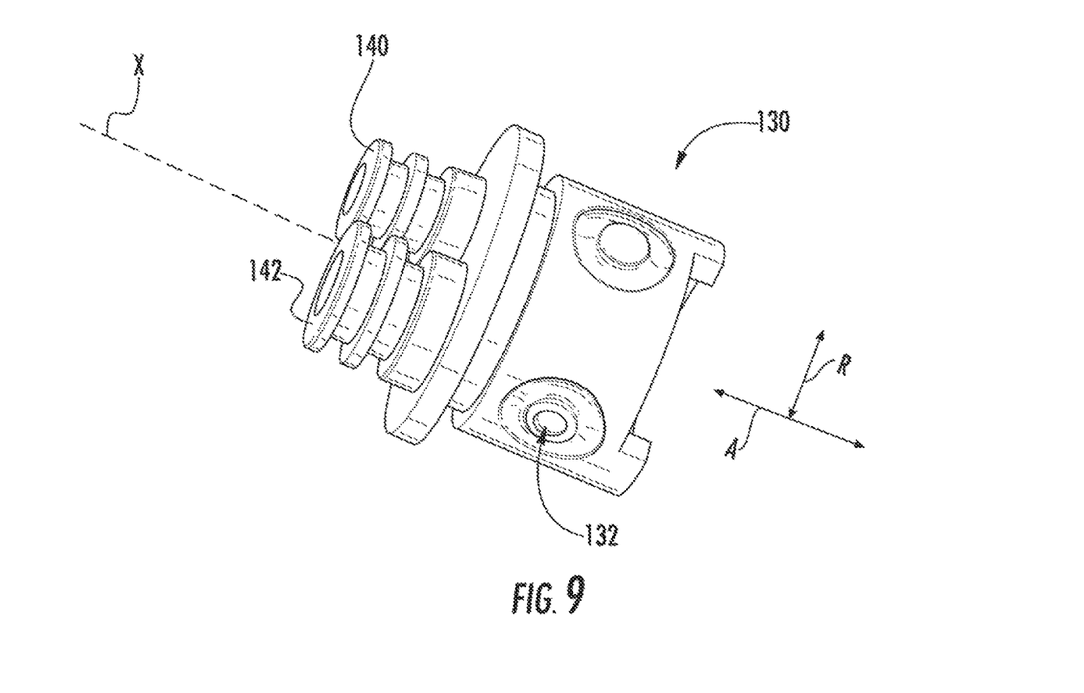
FIG. 9 provides a perspective view of the spool body of the example filter assembly of FIG. 3.

FIG. 8 provides a perspective view of filter cartridge 150. FIG. 9 provides a perspective view of spool body 130 of spool valve 112. The connection between manifold 110 and filter cartridge 150 may facilitate rotation of spool body 130 with filter cartridge 150. For example, as shown in FIG. 9, male inlet port 140 and male outlet port 142 of manifold 110 may be offset from the axis of rotation X of spool body 130 along the radial direction R on spool body 130. Thus, a moment or torque applied by a user to filter cartridge 150 may be more uniformly applied to spool body 130 relative to filter cartridges having inlets and/or outlets that are coaxial with an axis of rotation. As a particular example, male inlet port 140 and male outlet port 142 of manifold 110 may be positioned equidistant from the axis of rotation X of spool body 130 along the radial direction R on spool body 130. In particular, a centroid of male inlet port 140 (e.g., in a plane that is perpendicular to the axial direction A) and a centroid of male outlet port 142 of manifold 110 (e.g., in the plane that is perpendicular to the axial direction A) may be positioned equidistant from the axis of rotation X of spool body 130 along the radial direction R on spool body 130. Such positioning of male inlet port 140 and male outlet port 142 on spool body 130 may facilitate rotation of spool body 130 with filter cartridge 150. Nonetheless, alternative examples may include a male inlet port and male outlet port of manifold 110 having centroids at offset positions (i.e., not positioned equidistant) from the axis of rotation X of spool body 130 along the radial direction R on spool body 130.

In some embodiments, filter assembly 100 includes one or more features to assist with positioning filter cartridge 150 on manifold 110 such that male inlet port 140 is received within female inlet port 170 while male outlet port 142 is received within female outlet port 172, e.g., and not vice versa. In particular, male inlet port 140 may be keyed or sized to female inlet port 170 while male outlet port 142 is keyed or sized to female outlet port 172. For example, male inlet port 140 and male outlet port 142 may have different cross-sectional areas, e.g., in a plane that is perpendicular to the axial direction A, and female inlet port 170 may not be complementary to male outlet port 142 while female outlet port 172 may not be complementary to male inlet port 140. As a particular example, male inlet port 140 and female inlet port 170 may be smaller than male outlet port 142 and female outlet port 172, respectively. Thus, filter assembly 100 may include features that poka-yoke the connection between filter cartridge 150 on manifold 110 to insure that male inlet port 140 is received within female inlet port 170 while male outlet port 142 is received within female outlet port 172.

In certain embodiments, filter assembly 100 also includes various seals, rings and/or gaskets for containing water flow within and/or out of filter assembly 100. For example, as shown in FIGS. 5 and 7, manifold 110 includes a plurality of O-rings 144. Respective O-rings 144 are disposed on each of male inlet port 140 and male outlet port 142 of manifold 110. Thus, some of O-rings 144 extend between male inlet port 140 and female inlet port 170 when filter cartridge 150 is mounted to manifold 110, and others of O-rings 144 extend between male outlet port 142 and female outlet port 172 when filter cartridge 150 is mounted to manifold 110. In such a manner, O-rings 144 may limit leakage of water from filter assembly 100 at the inlet and outlet connections between manifold 110 and filter cartridge 150. Filter cartridge 150 may not need to include O-rings mounted to female inlet port 170 and/or female outlet port 172. Advantageously, a cost of replacement filter cartridges may be reduced and potential damage to exposed O-rings may be limited as well.

Optional embodiments of filter assembly 100 also include a face seal 138. As shown, face seal 138 may extend between housing 120 and spool body 130 along the radial direction R. During use, face seal 138 generally limits or blocks fluid flow out of filter assembly 100 via a gap between housing 120 and spool body 130. In some embodiments, filter assembly 100 further includes one or more axial seals 139 that extend between housing 120 and spool body 130 along the radial direction R. Axial seals 139 may be spaced apart from one another on spool body 130 by ninety-degrees and may also be mounted to spool body 130 such that axial seals 139 rotate with spool body 130. Respective axial seals 139 may be positioned at and extend around inlet passage 132 and outlet passage 134 on an outer surface of spool body 130, and other axial seals 139 may be positioned between inlet passage 132 and outlet passage 134 on the outer surface of spool body 130. Axial seals 139 may limit fluid flow into and/or out of inlet passage 132 and outlet passage 134 into a gap between housing 120 and spool body 130.

Turning now to FIG. 8, filter cartridge 150 may include an outer wall 174, e.g., that extends from casing 160 along the axial direction A. As an example, outer wall 174 may be integrally formed (e.g., as a unitary monolithic element) with casing 160 such that casing 160 and outer wall 174 are constructed of or with a single continues piece of material, such as molded plastic. When assembled, outer wall 174 is positioned at or adjacent first end portion 152 of casing 160 and may extend around female inlet port 170 and female outlet port 172 on filter cartridge 150. Thus, female inlet port 170 and female outlet port 172 may be disposed within outer wall 174 along the radial direction R. Outer wall 174 may protect or shield female inlet port 170 and female outlet port 172. For example, if filter cartridge 150 is dropped, outer wall 174 may impact a surface rather than female inlet port 170 and female outlet port 172. In some such embodiments, damage to fluid connections of filter cartridge 150 may be advantageously limited.

The connection between manifold 110 and filter cartridge 150 may facilitate rotation of spool body 130 with filter cartridge 150. For example, as shown in FIG. 9, male inlet port 140 and male outlet port 142 of manifold 110 may be offset from the axis of rotation X of spool body 130 along the radial direction R on spool body 130. Thus, a moment or torque applied by a user to filter cartridge 150 may be more uniformly applied to spool body 130 relative to filter cartridges having inlets and/or outlets that are coaxial with an axis of rotation. As a particular example, male inlet port 140 and male outlet port 142 of manifold 110 may be positioned equidistant from the axis of rotation X of spool body 130 along the radial direction R on spool body 130. In particular, a centroid of male inlet port 140 (e.g., in a plane that is perpendicular to the axial direction A) and a centroid of male outlet port 142 of manifold 110 (e.g., in the plane that is perpendicular to the axial direction A) may be positioned equidistant from the axis of rotation X of spool body 130 along the radial direction R on spool body 130. Such positioning of male inlet port 140 and male outlet port 142 on spool body 130 may facilitate rotation of spool body 130 with filter cartridge 150. Of course, as noted above, alternative examples may include a male inlet port and male outlet port of manifold 110 having centroids at offset positions (i.e., not positioned equidistant) from the axis of rotation X of spool body 130 along the radial direction R on spool body 130.

Turning back to FIGS. 4 and 5, filter cartridge 150 also includes a pair of end caps 180 (i.e., caps 180A and 180B). Caps 180 are generally mounted to or disposed on filter medium 164. In particular, caps 180 are positioned at opposite ends of filter medium 164 along the axial direction A. In other words, one cap 180A is disposed on the first medium end 212 at first end portion 152. Another cap 180B is disposed on the second medium end 214 at second end portion 154. In some such embodiments, second end cap 180B is sealed between the filtered volume 168 and the unfiltered volume 166. First end cap 180A may be at least partially unsealed in fluid communication with the manifold 130 to permit water from the filtered volume 168. Caps 180 may be formed from any suitable material, such as one or more non-corrosive metals or plastics (e.g., polyethylene). Moreover, caps 180 can be mounted to filter medium 164 using any suitable method or mechanism. For example, caps 180 may be mounted to filter medium 164 using glue, compression fit, over-molding, ultrasonic welding, etc. During use, caps 180 can generally assist with separating unfiltered volume 166 from filtered volume 168 and thereby restrict fluid flow between unfiltered volume 166 and filtered volume 168 through filter medium 164.

As shown, a tension ridge 220 is provided on one or more of end caps 180. For example, tension ridge 220 may be provided on end cap 180A. In optional embodiments, tension ridge 220 is formed as a ring 222 extending outward from end cap 180A (e.g., in the radial direction R towards outer wall 174). In some such embodiments, tension ridge 220 may be integrally formed (e.g., as a unitary monolithic element) with end cap 180A or, alternatively, be provided as a discrete and selectively-removable feature.

When assembled, tension ridge 220 is positioned radially inward from outer wall 174. Tension ridge 220 may be spaced apart from an inner surface 175 of outer wall 174, e.g., in the radial direction R. In some such embodiments, a capillary passage 224 is defined in the radial direction R between tension ridge 220 and the inner surface 175 of outer wall 174. In other words, capillary passage 224 may be defined by distance between inner surface 175 and tension ridge 220. The capillary passage 224 may thus have a passage width 226 that is defined in the radial direction R defined between tension ridge 220 and the inner surface 175 of outer wall 174.

The capillary passage 224 is generally defined along the filtration path 102. During use, unfiltered fluid may thus flow through capillary passage 224 before entering the unfiltered volume 166. The passage width 226 must be sufficient to permit the flow of water therethrough (e.g., under pressure from water supplied to filter assembly 100 by a water supply). However, the passage width 226 must also be sufficient to generally maintain surface tension for water across the capillary passage 224 (e.g., when no water is being flowed to filter assembly 100). In turn, the passage width 226 may be equal to or less than a capillary width of water therein. Moreover, the passage width 226 may thus represent a minimum or maximum spacing between tension ridge 220 and the inner surface 175 of outer wall 174, e.g., through which filtration path 102 extends. In specific embodiments, the passage width 226 is between 0.005 inches and 0.1 inches. In other embodiments, the passage width 226 is between 0.005 inches and 0.05 inches. In still other embodiments, the passage width 226 is between 0.005 inches and 0.025 inches.

After water has ceased flowing through filtration assembly (e.g., during a period of non-use) water may be held within capillary passage 224 by surface tension. This water between tension ridge 220 and outer wall 174 may form a vacuum seal across filtration path 102. In turn, water within unfiltered volume 166 and filtered volume 168 may thus be sealed within filter medium 164 (e.g., within unfiltered volume 166 and filtered volume 168). The vacuum seal may be maintained even in a horizontal orientation of filter cartridge 150 (e.g., when axial direction A is positioned perpendicular or otherwise at an angle to the vertical direction V—FIG. 1). Advantageously, the vacuum seal formed by surface tension may ensure water does not inadvertently spill from filter cartridge 150, e.g., during removal of filter cartridge 150 from manifold 110.

Optionally, multiple tension ridges 220 may be provided on end cap 180A. As shown, a plurality of coaxial tension ridges 220 may be formed as discrete rings 222 on end cap 180A. Each tension ridge 220 may be spaced apart along the axial direction A. In turn, a spaced groove 228 may be defined in the axial direction A between two adjacent tension ridges 220. Moreover, the groove depth (i.e., the radial distance between an inner radial extreme of spaced groove 228 and inner surface 175 of outer wall 174) may be greater than the passage width 226 of capillary passage 224. Water may thus be collected within spaced groove 228 (e.g., during a period of non-use). Advantageously, the surface tension may be maintained within capillary passage 224 without requiring an excessive amount of surface area (e.g., at end cap 180A) that might otherwise unduly restrict the flow of water through capillary passage 224.

As shown, the end cap 180A at first end portion 152 of casing 160 defines an outlet 186 for water from filtered volume 168 of casing 160. Water filtered by filter medium 164 can thus exit filtered volume 168 through end cap 180A at first end portion 152 of casing 160. In some embodiments, a top plate 182 is also positioned at first end portion 152 of casing 160, e.g., on or end cap 180A at first end portion 152 of casing 160. Top plate 182 may be integrally formed (e.g., as a unitary monolithic element) with cap 180A or, alternatively, be provided as a discrete and selectively-removable feature. Optionally, top plate 182 includes an O-ring 184 that engages or meshes with casing 160 adjacent female outlet port 172. Top plate 182 and O-ring 184 can assist caps 180 with separating unfiltered volume 166 from filtered volume 168 and thereby restrict fluid flow between unfiltered volume 166 and filtered volume 168 through filter medium 164. O-ring 184 may be offset from a central axis of filtered volume 168 along the radial direction R. Thus, water may flow out of filtered volume 168 via an outlet offset from the central axis of filtered volume 168 along the radial direction R.

The position of end cap 180A and top plate 182 may be selected to permit the flow of filtered liquid from filtered volume 168 via female outlet port 172. For example, top plate 182 defines an opening or outlet (e.g., fluid outlet 178) that extends through top plate 182. O-ring 184 may extend around outlet 178 of top plate 182. Outlet 178 of top plate 182 is contiguous or in fluid communication with filtered volume 168 within filtered medium 164. Thus, filtered liquid exiting filter cartridge 150 at female outlet port 172 flows through outlet 178 of top plate 182 between filtered volume 168 within filtered medium 164 and female outlet port 172. As shown in FIG. 5, outlet 178 of top plate 182 is offset from the central axis of casing 160, which corresponds to the axis of rotation X in the exemplary embodiment shown in FIGS. 4 through 7, along the radial direction R. Moreover, outlet 178 may be aligned with female outlet port 172. In turn, outlet 178 of top plate 182 places filtered volume 168 within filtered medium 164 in fluid communication with female outlet port 172, despite female outlet port 172 being offset from the central axis of casing 160 (or filter medium 164 within casing 160) along the radial direction R.

Turning now to FIGS. 10 through 13, multiple alternative embodiments of filter cartridge 150 are illustrated. It is understood that, except as otherwise indicated, the embodiments of FIGS. 10 through 13 are substantially similar to the above-described embodiments.

Figure 10:
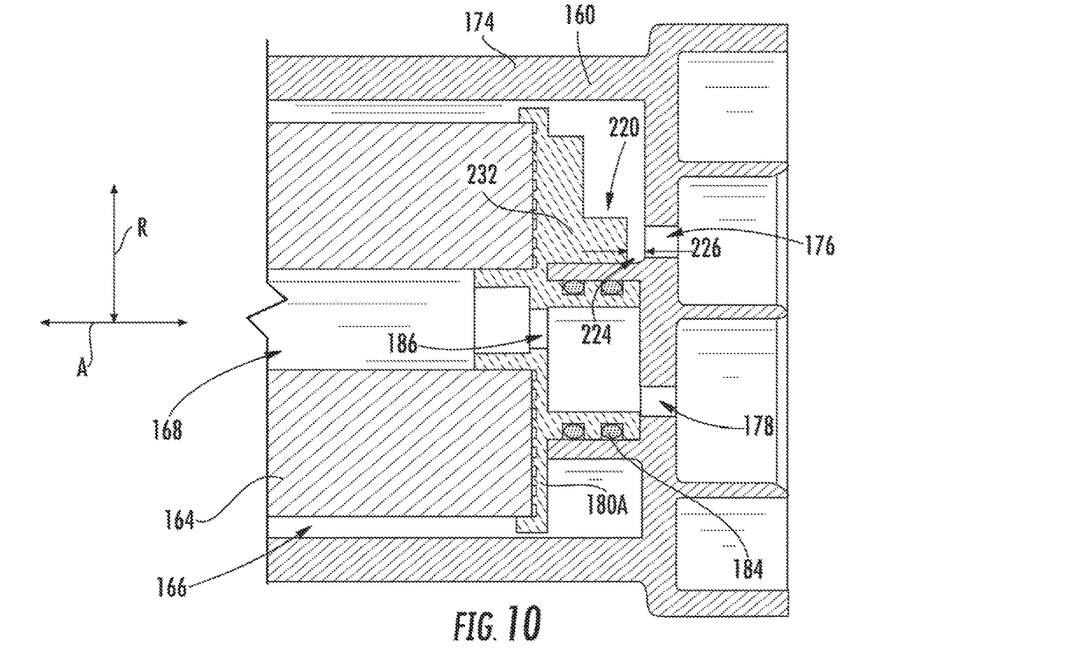
FIG. 10 provides a partial, cross-sectional view of a filter assembly embodiment according to other example embodiments of the present disclosure.
Figure 11:
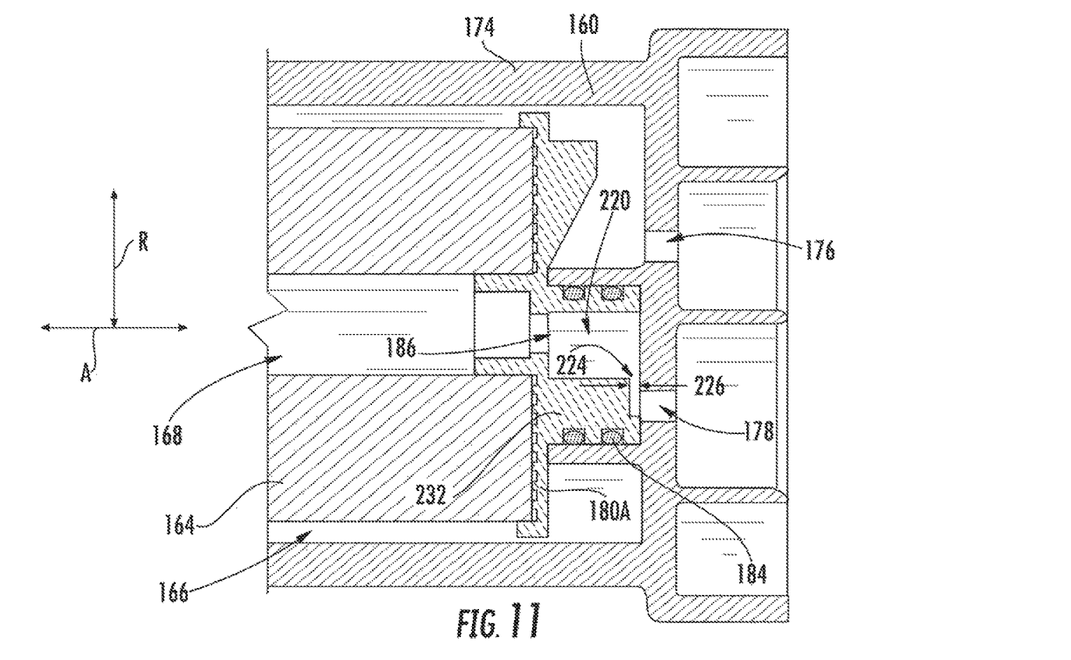
FIG. 11 provides a partial, cross-sectional view of a filter assembly embodiment according to still other example embodiments of the present disclosure.

Turning specifically to FIGS. 10 and 11, in some embodiments, tension ridge 220 is formed as an internal prong 232. As shown, internal prong 232 may extend from end cap 180A in the axial direction A. In optional embodiments, internal prong 232 is fixed to end cap 180A. For instance, internal prong 232 may be integrally formed (e.g., as a unitary monolithic element) with end cap 180A.

As shown in FIG. 10, in some embodiments, internal prong 232 is generally positioned downstream from fluid inlet 176 and upstream from unfiltered volume 166. Specifically, internal prong 232 extends in the axial direction A toward fluid inlet 176. The capillary passage 224 may be defined between the internal prong 232 and fluid inlet 176. During use, unfiltered fluid may thus flow through capillary passage 224 before entering the unfiltered volume 166. In turn, the size of the capillary passage 224 may be sufficient to generally maintain surface tension for water between internal prong 232 and fluid inlet 176—e.g., when no water is being flowed to filter assembly 100 along filtration path 102 (FIG. 4). However, the capillary passage 224 may also be sized to permit the flow of water therethrough (e.g., under pressure from water supplied to filter assembly 100 by a water supply). In turn, a passage width 226 may be defined by the spacing (e.g., axial spacing) between internal prong 232 and fluid inlet 176. Moreover, passage width 226 may be equal to or less than a capillary width of water therein.

As shown in FIG. 11, in some embodiments, internal prong 232 is generally positioned upstream from fluid outlet 178 and downstream from filtered volume 168. Specifically, internal prong 232 extends in the axial direction A toward fluid outlet 178. The capillary passage 224 may be defined between the internal prong 232 and fluid outlet 178. During use, unfiltered fluid may thus flow through capillary passage 224 before entering fluid outlet 178. In turn, the size of the capillary passage 224 may be sufficient to generally maintain surface tension for water between internal prong 232 and fluid outlet 178 (e.g., when no water is being flowed to filter assembly 100). However, the capillary passage 224 may also be sized to permit the flow of water therethrough (e.g., under pressure from water supplied to filter assembly 100 by a water supply). In turn, a passage width 226 may be defined by the spacing (e.g., axial spacing) between internal prong 232 and fluid inlet 176. Moreover, passage width 226 may be equal to or less than a capillary width of water therein.

Figure 12:
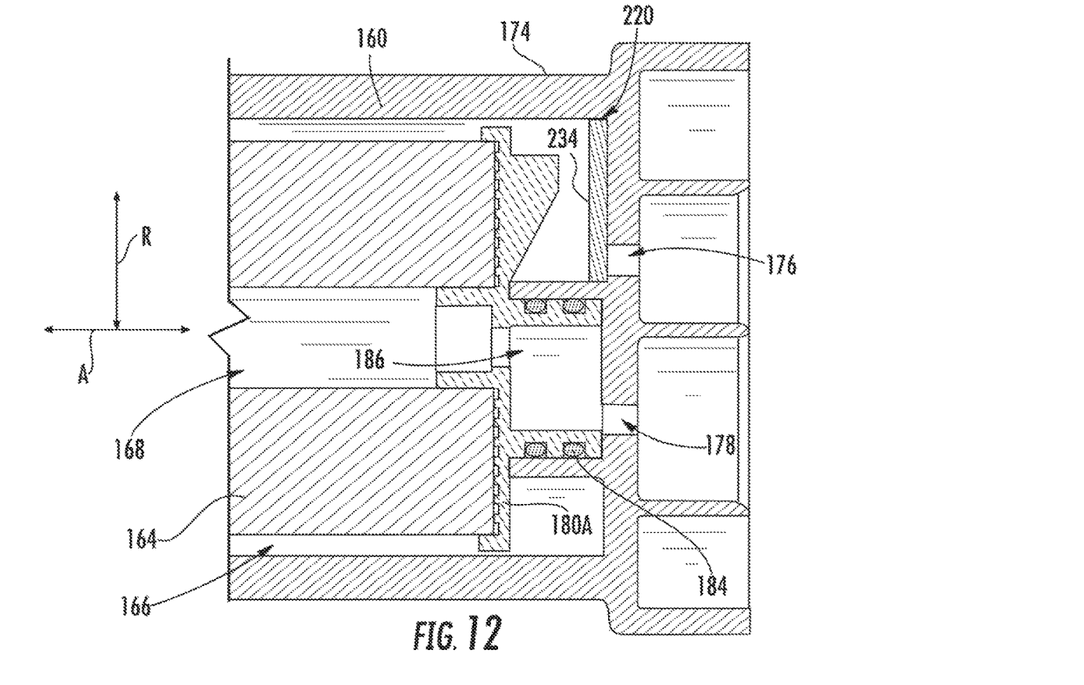
FIG. 12 provides a partial, cross-sectional view of another filter assembly embodiment according to further example embodiments of the present disclosure.
Figure 13:
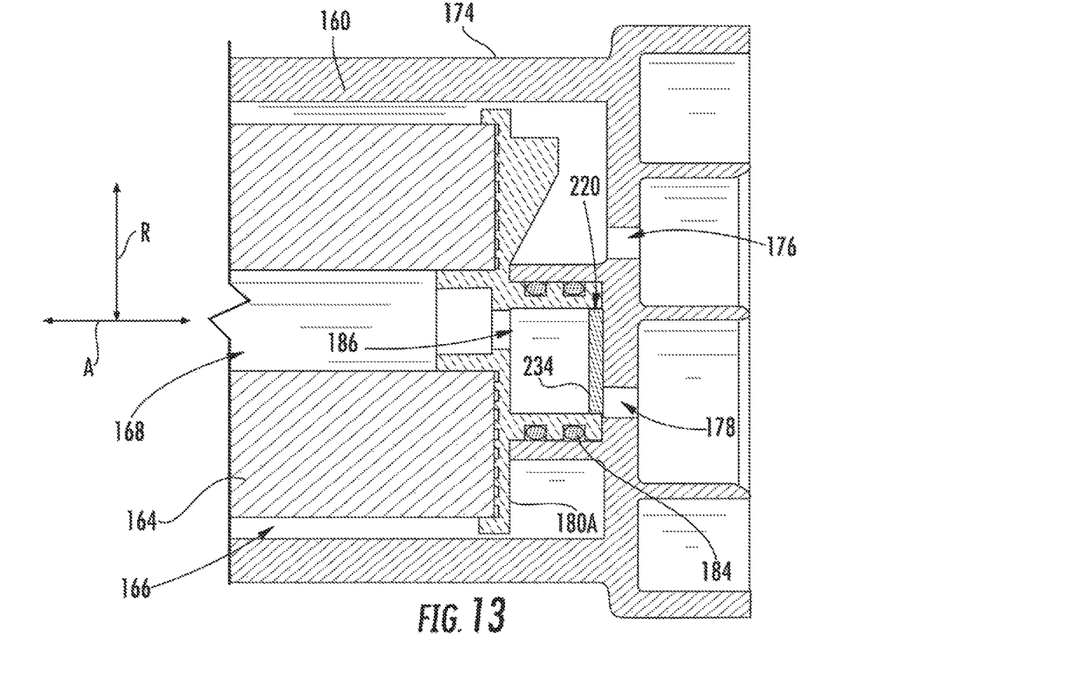
FIG. 13 provides a partial, cross-sectional view of another filter assembly embodiment according to still further example embodiments of the present disclosure.

Turning specifically to FIGS. 12 and 13, in some embodiments, tension ridge 220 is formed on a permeable panel 234. Generally, the permeable panel 234 may be formed from a suitable paper or wire mesh having a plurality of pores (not pictured) through which water may flow (e.g., under pressure from a water supply). Thus, tension ridge 220 may be formed as a portion (e.g., one or more fibers) of permeable panel 234. When assembled, some embodiments of permeable panel 234 extend across the filtration path 102, e.g., such that fluid along filtration path 102 must pass through the pores of the permeable panel 234.

As shown in FIG. 12, in some embodiments, permeable panel 234 is generally positioned downstream from fluid inlet 176 and upstream from unfiltered volume 166. Specifically, permeable panel 234 is positioned across fluid inlet 176. For instance, permeable panel 234 may be held in fixed attachment to or within casing 160 by a suitable retention joint (e.g., adhesive, friction fit, spin weld, etc.). The capillary passage may be defined by the pores of permeable panel 234. During use, unfiltered fluid may thus flow through permeable panel 234 before entering the unfiltered volume 166. In turn, the size of the pores of permeable panel 234 may be sized to permit the flow of water therethrough (e.g., under pressure from water supplied to filter assembly 100 by a water supply). However, the pores of permeable panel 234 may also be sufficiently sized to generally maintain surface tension for water across permeable panel 234 (e.g., when no water is being flowed to filter assembly 100).

In turn, the pores of permeable panel 234 may be defined to have a cross-sectional width equal to or less than a capillary width of water therein.

As shown in FIG. 13, in some embodiments, permeable panel 234 is generally positioned upstream from fluid outlet 178 and downstream from filtered volume 168. Specifically, permeable panel 234 is positioned across fluid outlet 178. For instance, permeable panel 234 may be held in fixed attachment to or within casing 160 by a suitable retention joint (e.g., adhesive, friction fit, spin weld, etc.). Generally, a plurality of capillary passages may be defined by the pores of permeable panel 234. During use, unfiltered fluid may thus flow through permeable panel 234 before entering the unfiltered volume 166. In turn, the size of the pores of permeable panel 234 may be sized to permit the flow of water therethrough (e.g., under pressure from water supplied to filter assembly 100 by a water supply). However, the pores of permeable panel 234 may also be sufficiently sized to generally maintain surface tension for water across permeable panel 234 (e.g., when no water is being flowed to filter assembly 100). In turn, the pores of permeable panel 234 may be defined to have a cross-sectional width equal to or less than a capillary width of water therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly defining a filtration path between a fluid inlet and a fluid outlet, the filter assembly comprising:
   a filter medium defining a filtered volume and unfiltered volume, the filter medium extending along an axial direction between a first end and a second end, the first end being proximal the fluid inlet and fluid outlet, and the second end being distal the fluid inlet and the fluid outlet;
   an end cap disposed on the first end of the filter medium, wherein the filter assembly defines a capillary passage directing a fluid flow along the filtration path, the capillary passage having a passage width equal to or less than a capillary width of water therein, the capillary width being between 0.005 inches and 0.1 inches such that surface tension of water within the capillary passage forms a vacuum seal when no water is flowed through the filter assembly; a ring extending in a radial direction outward from the end cap to define at least a portion of the capillary passage; and an outer casing wall disposed about the filter medium and the end cap, wherein the passage width of the capillary passage is defined in the radial direction between the ring and the outer casing wall.

2. The filter assembly of claim 1, wherein the ring comprises a plurality of coaxial ridges spaced apart along an axial direction.

3. The filter assembly of claim 1, wherein the end cap is a first end cap, wherein the filter further comprises a second end cap disposed on the second end of the filter medium, and wherein the second end cap is sealed between the filtered volume and the unfiltered volume.

4. A filter assembly defining an axial direction and a radial direction, the filter assembly comprising:
- a manifold having a spool valve, the spool valve comprising a housing, a spool body, a male inlet port and a male outlet port, the spool body received in the housing such that the spool body is rotatable relative to the housing, the male inlet port and the male outlet port mounted to the spool body such that the male inlet port and the male outlet port extend away from the spool body along the axial direction, the male inlet port and the male outlet port spaced apart from each other along the radial direction;
- a filter cartridge mountable to the manifold, the filter cartridge comprising
  - a casing,
  - a filter medium positioned within the casing, the filter medium defining a filtered volume and unfiltered volume, the filter medium extending along the axial direction between a first end proximal the manifold, and a second end distal the manifold, and
  - an end cap disposed on the first end of the filter medium,
- wherein the filter assembly defines a capillary passage directing a fluid flow along a filtration path, the capillary passage having a passage width equal to or less than a capillary width of water therein, the capillary width being between 0.005 inches and 0.1 inches such that surface tension of water within the capillary passage forms a vacuum seal when no water is flowed through the filter assembly; a ring extending in a radial direction outward from the end cap to define at least a portion of the capillary passage; and an outer casing wall disposed about the filter medium and the end cap, wherein the passage width of the capillary passage is defined in the radial direction between the ring and the outer casing wall.

5. The filter assembly of claim 4, wherein the ring comprises a plurality of coaxial ridges spaced apart along an axial direction.

6. The filter assembly of claim 4, wherein the end cap is a first end cap, wherein the filter further comprises a second end cap disposed on the second end of the filter medium, and wherein the second end cap is sealed between the filtered volume and the unfiltered volume.

* * * * *